(12) United States Patent
Wills et al.

(10) Patent No.: US 11,543,265 B2
(45) Date of Patent: Jan. 3, 2023

(54) THIRD-PARTY ACCESSIBLE APPLICATION PROGRAMMING INTERFACE FOR GENERATING 3D SYMBOLOGY

(71) Applicant: Rockwell Collins, Inc., Cedar Rapids, IA (US)

(72) Inventors: Jeremy D. Wills, Marion, IA (US); Jason A. Myren, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 928 days.

(21) Appl. No.: 16/277,175

(22) Filed: Feb. 15, 2019

(65) Prior Publication Data
US 2020/0264009 A1 Aug. 20, 2020

(51) Int. Cl.
*G06F 7/00* (2006.01)
*G01C 23/00* (2006.01)
*G02B 27/01* (2006.01)
*G06F 9/54* (2006.01)

(52) U.S. Cl.
CPC ....... *G01C 23/005* (2013.01); *G02B 27/0101* (2013.01); *G06F 9/54* (2013.01); *G02B 2027/014* (2013.01); *G02B 2027/0134* (2013.01)

(58) Field of Classification Search
CPC .............. G01C 23/005; G02B 27/0101; G02B 2027/0134; G06F 9/54
USPC .......................................................... 701/3
See application file for complete search history.

(56) References Cited

U.S. PATENT DOCUMENTS

| 8,788,126 | B1* | 7/2014 | Bull ..................... G08G 5/0021 701/14 |
| 10,163,185 | B1 | 12/2018 | Yarker et al. |
| 2011/0285709 | A1 | 11/2011 | Mejdrich et al. |
| 2011/0305137 | A1* | 12/2011 | Chu ...................... H04L 47/245 370/230 |
| 2012/0203795 | A1* | 8/2012 | Ackerman ........ G06F 16/24575 707/E17.014 |
| 2015/0019480 | A1* | 1/2015 | Maquaire ................ G06F 16/23 707/609 |

(Continued)

FOREIGN PATENT DOCUMENTS

| CN | 106355632 A | 1/2017 |
| EP | 2204639 A1 | 7/2010 |
| EP | 3407251 A1 | 11/2018 |

OTHER PUBLICATIONS

Extended EP Search Report dated Jun. 17, 2020 for EP Application No. 19208932.

*Primary Examiner* — Jonathan M Blancha
(74) *Attorney, Agent, or Firm* — Suiter Swantz pc llo (57) ABSTRACT

A system that employs a third-party accessible application programming interface (API) to generate symbology for a three-dimensional view is disclosed. In embodiments, the third-party accessible API is running on or configured to communicate with at least one controller for an aircraft display system. The third-party accessible API is configured to receive a set of parameters for generating three-dimensional symbology. The controller is configured to receive the three-dimensional symbology from the third-party accessible API. The controller is further configured to generate a three-dimensional view that includes proprietary symbology and the three-dimensional symbology from the third-party accessible API at a display of the aircraft display system.

12 Claims, 10 Drawing Sheets

(56) References Cited

U.S. PATENT DOCUMENTS

| | | | | |
|---|---|---|---|---|
| 2015/0331549 | A1* | 11/2015 | Legris | G06T 11/60 |
| | | | | 715/800 |
| 2016/0065563 | A1* | 3/2016 | Broadbent | H04L 63/0281 |
| | | | | 726/9 |
| 2017/0036776 | A1* | 2/2017 | He | G08G 5/025 |
| 2017/0310791 | A1* | 10/2017 | Palse | H04L 43/16 |
| 2018/0315322 | A1* | 11/2018 | Servantie | G08G 5/045 |

* cited by examiner

612 — SELECTIVELY EXCLUDING THE THREE-DIMENSIONAL SYMBOLOGY FROM THE THREE-DIMENSIONAL VIEW WHEN THE THREE-DIMENSIONAL SYMBOLOGY HAS AN OVERLAPPING LOCATION WITH A HIGHER PRIORITY SYMBOLOGY

614 — INCREASING TRANSPARENCY OR DECREASING LAYER POSITION OF THE THREE-DIMENSIONAL SYMBOLOGY WITHIN THE THREE-DIMENSIONAL VIEW WHEN THE THREE-DIMENSIONAL SYMBOLOGY HAS AN OVERLAPPING LOCATION WITH A HIGHER PRIORITY SYMBOLOGY

FIG.6D

THIRD-PARTY ACCESSIBLE APPLICATION PROGRAMMING INTERFACE FOR GENERATING 3D SYMBOLOGY

BACKGROUND

Open system architecture (OSA) is a key selling point of modern avionics systems, allowing original equipment manufacturers (OEMs) to self-develop, or contract third-parties, to create functionality which can be seamlessly incorporated into the avionics human-machine interface (HMI). While several application programming interfaces (APIs) and development tool kits exist, there is no such interface for incorporating externally generated symbology into three-dimensional views (e.g., the three-dimensional imagery of a synthetic vision system (SVS), or the like).

SUMMARY

A system that employs a third-party accessible application programming interface (API) to generate symbology for a three-dimensional view is disclosed. In embodiments, the third-party accessible API is running on or configured to communicate with at least one controller for an aircraft display system. The third-party accessible API is configured to receive a set of parameters for generating three-dimensional symbology. The controller is configured to receive the three-dimensional symbology from the third-party accessible API. The controller is further configured to generate a three-dimensional view that includes proprietary symbology and the three-dimensional symbology from the third-party accessible API at a display of the aircraft display system.

A method that employs a third-party accessible API to generate symbology for a three-dimensional view is also disclosed. In embodiments of the method, a set of parameters for generating three-dimensional symbology is received via the third-party accessible API. The three-dimensional symbology generated by the API is transmitted to an aircraft display system including at least one display. A three-dimensional view that includes proprietary symbology and the three-dimensional symbology from the third-party accessible API is then generated at the display.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A system and method that employ a third-party accessible application programming interface (API) to generate symbology for a three-dimensional (3D) view are disclosed. While several APIs and development tool kits exist, there is no such interface for incorporating externally generated symbology into 3D views (e.g., the 3D imagery of a synthetic vision system (SVS), or the like). Consequently, there is a need for an API that allows an external entity to implement applications which can draw position and context sensitive symbology (both static or dynamically moving symbols) into a SVS image or any other 3D view. For example, an avionics system may provide information to an external entity (e.g., client server/device) defining the geo-referenced volume being displayed. The external entity can then use the received contextual framework to decide which symbology should be displayed and where it should be placed in the image. The symbology may be sent in the form of widget runtime parameters to a graphics server/controller that renders the 3D view. The graphics server/controller can use the runtime parameters along with statically defined widget parameters to render and scale the third-party symbology into a combined image (e.g., a 3D view) that includes a mixture of proprietary symbology and the third-party symbology.

In embodiments, the system may include an API hosted by a remote/local server provides clients that provides client servers/devices with the ability to submit geo-referenced draw commands (e.g., latitude, longitude, altitude) in place of pixel position coordinates (e.g., x, y, z coordinates). The API can be configured to generate 3D symbologies in the form of 3D widgets to be used as building blocks for 3D features of a SVS image or any other 3D view. In embodiments, the system can also include performance management resources that characterizes building block widgets to allow worst case execution time to be established. The system may further allow for partitioning of core safety-critical functionality separate from third-party software to allow graceful degradation should third-party software fail.

Figure 1A:
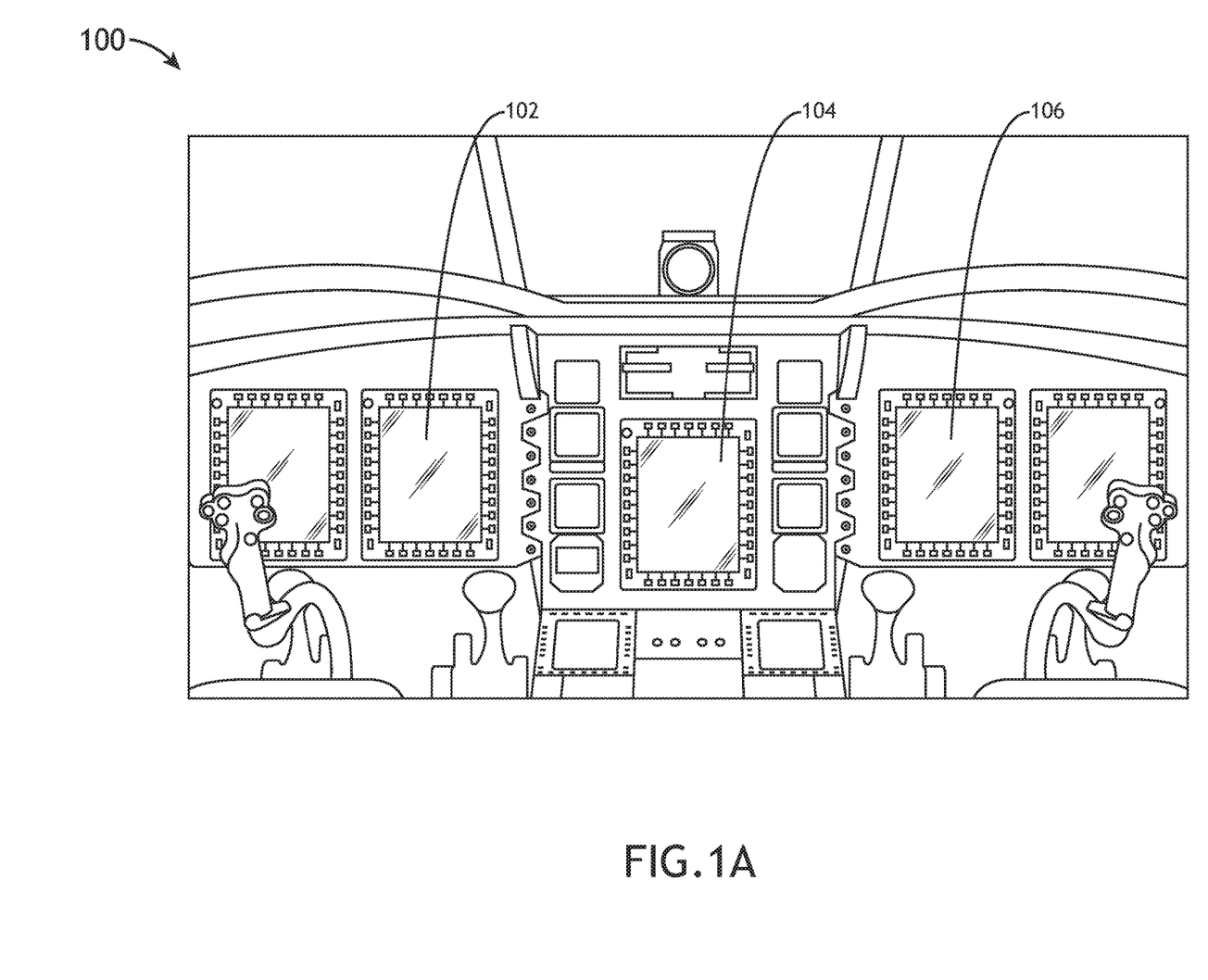
FIG. 1A is an illustration of an aircraft environment that may employ a third-party accessible application programming interface (API) to generate symbology for a three-dimensional view, in accordance with example embodiments of this disclosure.

FIG. 1A illustrates an example embodiment of an aircraft environment 100 in which a system and method that employ a third-party accessible API to generate symbology for a 3D view can be implemented. For example, the aircraft environment 100 (e.g., a cockpit) includes one or more displays that can be employed to present 3D views (e.g., 3D maps, SVS views, and the like). The aircraft environment 100 in FIG. 1A is shown to include at least one primary flight display 102 and at least one multi-function display 104 that are viewable by a flight crew member (e.g., pilot). In some embodiments, the aircraft environment 100 may further include at least one primary/secondary flight display 106 that is viewable by another flight crew member (e.g., co-pilot). The aircraft environment 100 illustrated in FIG. 1A illustrates an example embodiment. However, in other embodiments, the aircraft 100 environment can include any number of display devices (e.g., one, two, three, or more displays) including, but not limited to, one or more primary flight displays, secondary flight displays, and/or multi-function displays.

Figure 1B:
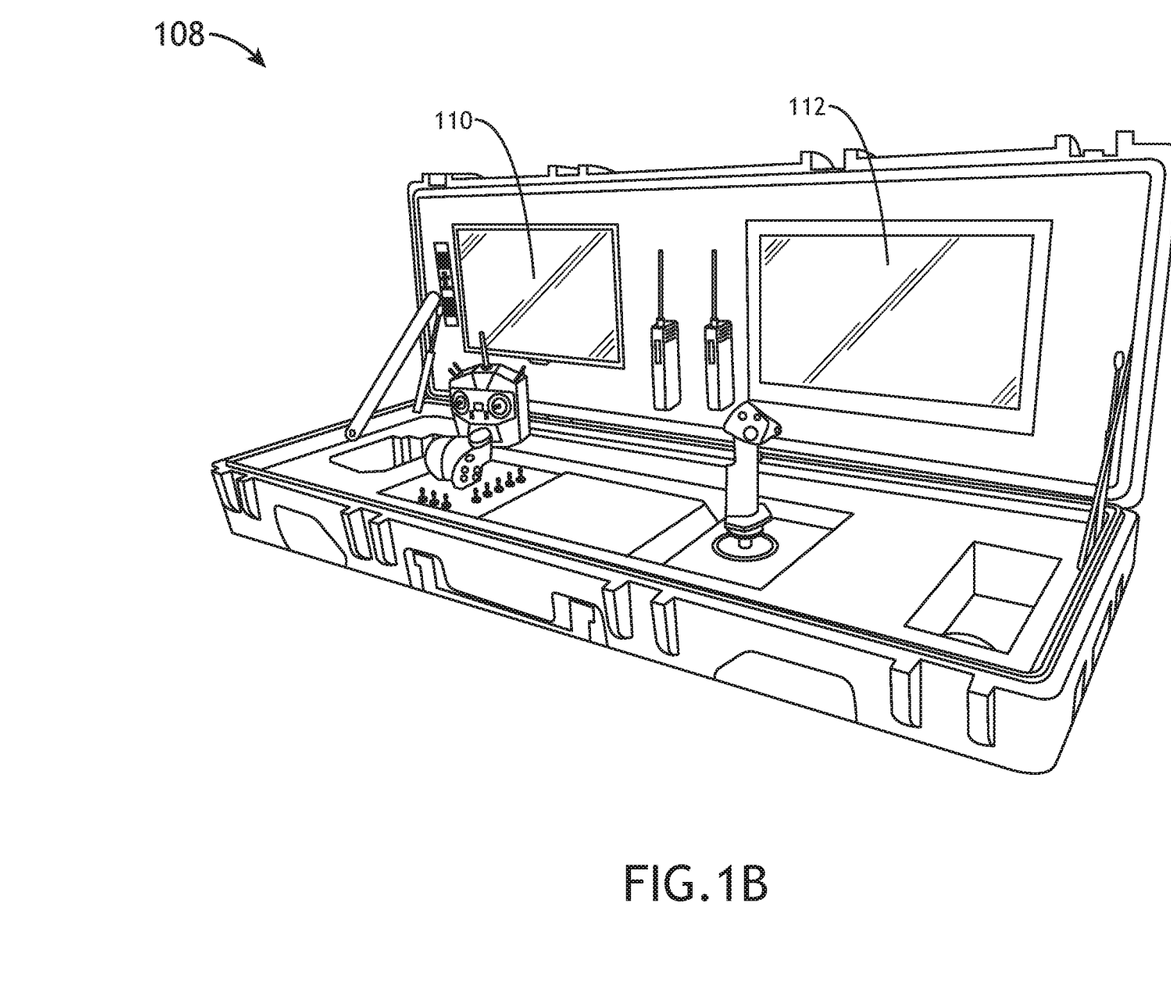
FIG. 1B is an illustration of an unmanned aerial vehicle (UAV) control station that may employ a third-party accessible API to generate symbology for a three-dimensional view, in accordance with example embodiments of this disclosure.

The system and method that employ a third-party accessible API to generate symbology for a 3D view can also be implemented in unmanned aerial vehicle (UAV) systems. For example, FIG. 1B illustrates an example embodiment of a UAV control station 108 in which a system and method that employ a third-party accessible API to generate symbology for a 3D view may be implemented. The UAV control station 108 may include any number of displays. For example, the UAV control station 108 in FIG. 1B is shown to include a first display 110 and a second display 112. In some embodiments, the UAV control station 108 is portable (e.g., as illustrated in FIG. 1B). In other embodiments, the UAV control station 108 may be within a facility or a moving vehicle (e.g., van, truck, boat, other aircraft, etc.).

Figure 2A:
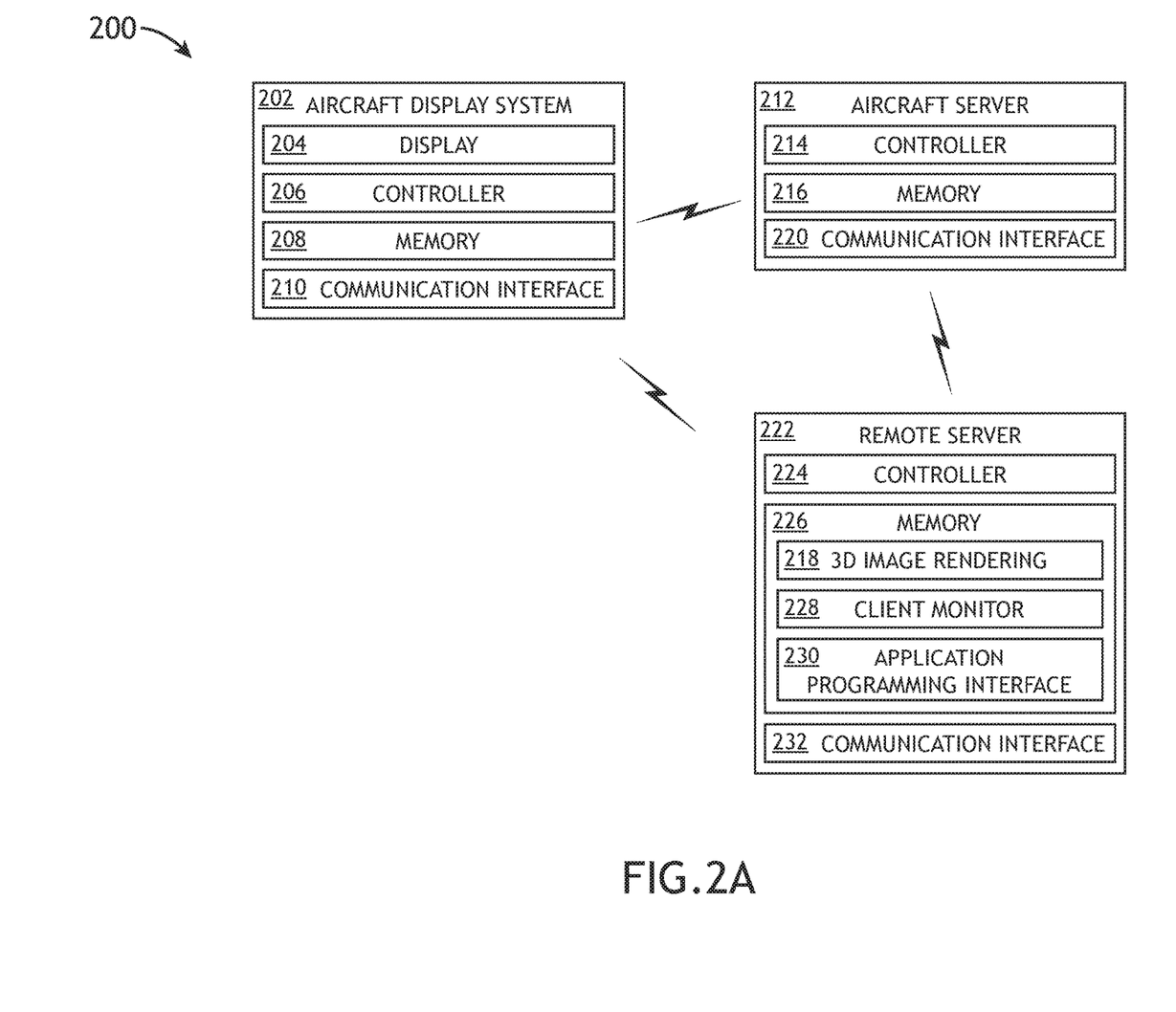
FIG. 2A is a block diagram illustrating an aircraft display system that employs a third-party accessible API to generate symbology for a three-dimensional view, in accordance with example embodiments of this disclosure.
Figure 2B:
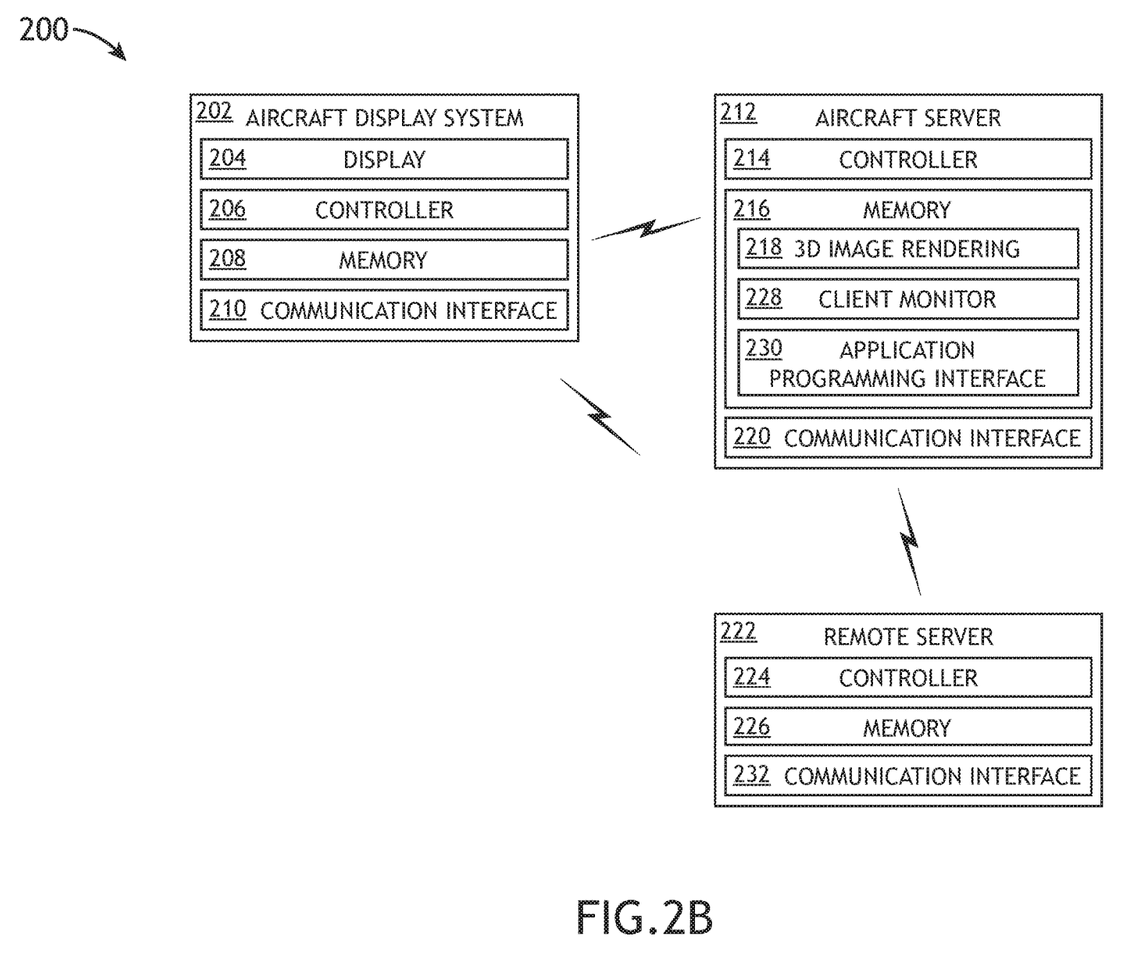
FIG. 2B is a block diagram illustrating an aircraft display system that employs a third-party accessible API to generate symbology for a three-dimensional view, in accordance with example embodiments of this disclosure.

Referring now to FIGS. 2A and 2B, a system 200 that employs a third-party accessible API to generate symbology for a 3D view is illustrated schematically, in accordance with an embodiment of this disclosure. The system 200 includes an aircraft display system 202 having at least one display 204. For example, the display 204 may be a primary flight display (e.g., display 102 or 106), a multi-function display (e.g., display 104), or any other type of aircraft display (e.g., another onboard display, a UAV controller display 110/112, or the like). The aircraft display system 202 may further include a controller 206, memory 208, and a communications interface 210.

The controller 206 provides processing functionality for at least the aircraft display system 202 and can include any number of processors, micro-controllers, circuitry, field programmable gate array (FPGA) or other processing systems, and resident or external memory for storing data, executable code, and other information accessed or generated by the aircraft display system 202. The controller 206 can execute one or more software programs embodied in a non-transitory computer readable medium (e.g., memory 208) that implement techniques described herein. The controller 206 is not limited by the materials from which it is formed or the processing mechanisms employed therein and, as such, can be implemented via semiconductor(s) and/or transistors (e.g., using electronic integrated circuit (IC) components), and so forth.

The memory 208 can be an example of tangible, computer-readable storage medium that provides storage functionality to store various data and/or program code associated with operation of the aircraft display system 202/controller 206, such as software programs and/or code segments, or other data to instruct the controller 206, and possibly other components of the aircraft display system 202, to perform the functionality described herein. Thus, the memory 208 can store data, such as a program of instructions for operating the aircraft display system 202, including its components (e.g., display 204, controller 206, communication interface 210, etc.), and so forth. It should be noted that while a single memory 208 is described, a wide variety of types and combinations of memory (e.g., tangible, non-transitory memory) can be employed. The memory 208 can be integral with the controller 206, can comprise stand-alone memory, or can be a combination of both. Some examples of the memory 208 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 210 can be operatively configured to communicate with components of the aircraft display system 202. For example, the communication interface 210 can be configured to retrieve data from the controller 206 or other devices (e.g., aircraft server 212, remote server 222, etc.), transmit data for storage in the memory 208, retrieve data from storage in the memory 208, and so forth. The communication interface 210 can also be communicatively coupled with the controller 206 to facilitate data transfer between components of the aircraft display system 202 and the controller 206. It should be noted that while the communication interface 210 is described as a component of the aircraft display system 202, one or more components of the communication interface 210 can be implemented as external components communicatively coupled to the aircraft display system 202 via a wired and/or wireless connection. The aircraft display system 202 can also include and/or connect to one or more input/output (I/O) devices (e.g., via the communication interface 210), such as display 204, a mouse, a trackball, a trackpad, a joystick, a line select device, a touchpad, a touchscreen, a keyboard, a keypad, a microphone (e.g., for voice commands) and so on. In embodiments, the communication interface 210 includes or is coupled to a transmitter, receiver, transceiver, physical connection interface, or any combination thereof.

The communication interface 210 may facilitate connectivity between the aircraft display system 202 and an aircraft server 212. For example, the communication interface 210 can be configured to communicate directly with the aircraft server 212 (e.g., via an ad-hoc connection), or may be configured to communicate with the aircraft server 212 over a network (e.g., a wired/wireless network).

The communication interface 210 may also facilitate connectivity between the aircraft display system 202 and a remote server 222. For example, the communication interface 210 can be configured to receive wireless communications from the remote server 222 (e.g., over an internet connection, cellular communications link, satellite communications link, or the like). In some embodiments, the connectivity between the aircraft display system 202 and the remote server 222 is at least partially established by the aircraft server 212. For example, the aircraft server 212 may be configured to communicate with the remote server 222 (during or prior to flight) and configured to communicate data and/or display signals to the aircraft display system 202 based on data received from the remote server 222.

In embodiments, the aircraft server 212 includes a controller 214, memory 216, and a communication interface 220. The controller 214 provides processing functionality for at least the aircraft server 212 and can include any number of processors, micro-controllers, circuitry, field programmable gate array (FPGA) or other processing systems, and resident or external memory for storing data, executable code, and other information accessed or generated by the aircraft server 212. The controller 214 can execute one or more software programs embodied in a non-transitory computer readable medium (e.g., memory 216) that implement techniques described herein. The controller 214 is not limited by the materials from which it is formed or the processing mechanisms employed therein and, as such, can be implemented via semiconductor(s) and/or transistors (e.g., using electronic integrated circuit (IC) components), and so forth.

The memory 216 can be an example of tangible, computer-readable storage medium that provides storage functionality to store various data and/or program code (e.g., a 3D image rendering application 218) associated with operation of the aircraft server 212/controller 214, such as software programs and/or code segments, or other data to instruct the controller 214, and possibly other components of the aircraft server 212, to perform the functionality described herein. Thus, the memory 216 can store data, such as a program of instructions for operating the aircraft server 212, including its components (e.g., controller 214, communication interface 220, etc.), and so forth. It should be noted that while a single memory 216 is described, a wide variety of types and combinations of memory (e.g., tangible, non-transitory memory) can be employed. The memory 216 can be integral with the controller 214, can comprise stand-alone memory, or can be a combination of both. Some examples of the memory 216 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 220 can be operatively configured to communicate with components of the aircraft server 212. For example, the communication interface 220 can be configured to retrieve data from the controller 214 or other devices (e.g., aircraft display system 202, remote server 222, etc.), transmit data for storage in the memory 216, retrieve data from storage in the memory 216, and so forth. The communication interface 220 can also be communicatively coupled with the controller 214 to facilitate data transfer between components of the aircraft server 212 and the controller 214. It should be noted that while the communication interface 220 is described as a component of the aircraft server 212, one or more components of the communication interface 220 can be implemented as external components communicatively coupled to the aircraft server 212 via a wired and/or wireless connection. The aircraft server 212 can also include and/or connect to one or more input/output (I/O) devices (e.g., via the communication interface 220), such as a display, a mouse, a trackball, a trackpad, a joystick, a line select device, a touchpad, a touchscreen, a keyboard, a keypad, a microphone (e.g., for voice commands) and so on. In embodiments, the communication interface 220 includes or is coupled to a transmitter, receiver, transceiver, physical connection interface, or any combination thereof.

In embodiments, the remote server 222 also includes a controller 224, memory 226, and a communication interface 232. The controller 224 provides processing functionality for at least the remote server 222 and can include any number of processors, micro-controllers, circuitry, field programmable gate array (FPGA) or other processing systems, and resident or external memory for storing data, executable code, and other information accessed or generated by the remote server 222. The controller 224 can execute one or more software programs embodied in a non-transitory computer readable medium (e.g., memory 226) that implement techniques described herein. The controller 224 is not limited by the materials from which it is formed or the processing mechanisms employed therein and, as such, can be implemented via semiconductor(s) and/or transistors (e.g., using electronic integrated circuit (IC) components), and so forth.

The memory 226 can be an example of tangible, computer-readable storage medium that provides storage functionality to store various data and/or program code (e.g., client monitoring application 228, API 230, etc.) associated with operation of the remote server 222/controller 224, such as software programs and/or code segments, or other data to instruct the controller 224, and possibly other components of the remote server 222, to perform the functionality described herein. Thus, the memory 226 can store data, such as a program of instructions for operating the remote server 222, including its components (e.g., controller 224, communication interface 232, etc.), and so forth. It should be noted that while a single memory 226 is described, a wide variety of types and combinations of memory (e.g., tangible, non-transitory memory) can be employed. The memory 226 can be integral with the controller 224, can comprise stand-alone memory, or can be a combination of both. Some examples of the memory 226 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 232 can be operatively configured to communicate with components of the remote server 222. For example, the communication interface 232 can be configured to retrieve data from the controller 224 or other devices (e.g., aircraft display system 202, aircraft server 212, etc.), transmit data for storage in the memory 226, retrieve data from storage in the memory 226, and so forth. The communication interface 232 can also be communicatively coupled with the controller 224 to facilitate data transfer between components of the remote server 222 and the controller 224. It should be noted that while the communication interface 232 is described as a component of the remote server 222, one or more components of the communication interface 232 can be implemented as external components communicatively coupled to the remote server 222 via a wired and/or wireless connection. The remote server 222 can also include and/or connect to one or more input/output (I/O) devices (e.g., via the communication interface 232), such as a display, a mouse, a trackball, a trackpad, a joystick, a line select device, a touchpad, a touchscreen, a keyboard, a keypad, a microphone (e.g., for voice commands) and so on. In embodiments, the communication interface 232 includes or is coupled to a transmitter, receiver, transceiver, physical connection interface, or any combination thereof.

Figure 4:
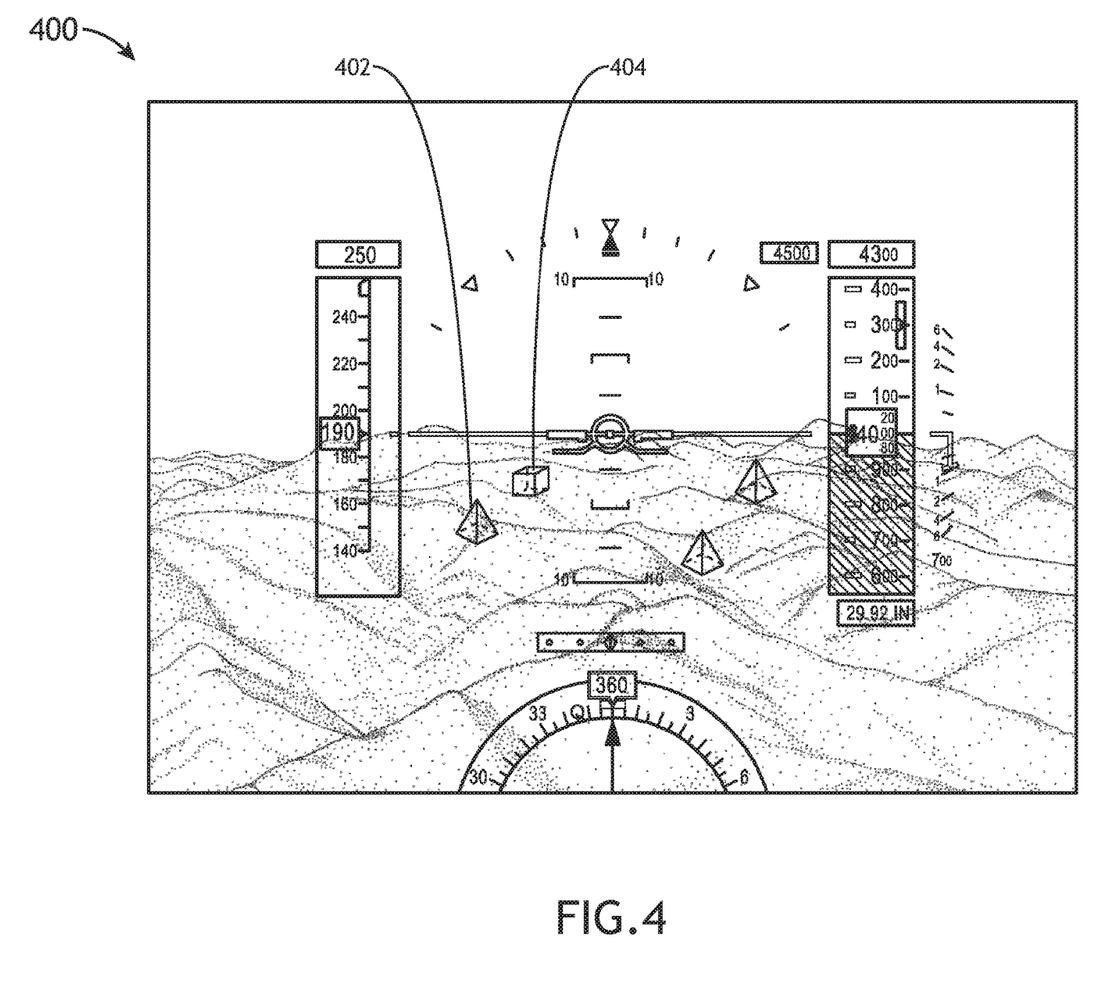
FIG. 4 illustrates a three-dimensional map view that can be presented via a display of an aircraft display system, such as the aircraft display system illustrated in FIGS. 2A and 2B, in accordance with example embodiments of this disclosure.

The aircraft display system 202 is configured to present a 3D view, such as the 3D view 400 illustrated in FIG. 4, via the display 204. In embodiments, the 3D view 400 is a moving 3D view. For example, the 3D view may be referenced to a predetermined reference point, a selected reference point, a reference point on the aircraft (e.g., nose, center, or tail of the aircraft), a pilot point of view, or an unmanned aerial vehicle point of view (e.g., camera location), or the like. In some embodiments, the 3D view 400 is a 3D moving map and/or a synthetic vision moving map. For example, the 3D view 400 may include 3D topographical and obstacle representations.

The controller 206 may be configured to generate the 3D view 400 at the display 204 based on map data and/or synthetic vision data retrieved from memory 208 and/or memory 216. For example, in an embodiment, the controller 206 is configured to receive the map data and/or synthetic vision data from the aircraft server 212 and store the map data and/or synthetic vision data in memory 208, where the controller 206 is then configured to generate the 3D view 400 at the display 204 based on the map data and/or synthetic vision data. In another embodiment, the map data and/or synthetic vision data is preloaded in the memory 208 of the aircraft display system 202, and the controller 206 may be configured to generate the 3D view 400 at the display 204 with/without communicating with the aircraft server 212. In yet another embodiment, the controller 214 of the aircraft server 212 (or controller 224 of the remote server 222) is configured to transmit instructions and/or display signals based on the map data and/or synthetic vision data to the aircraft display system 202 that cause the controller 206 to generate the 3D view 400 at the display 204. In this regard, controller 214/224 can be configured to execute a 3D image rendering application 218 from a respective memory 216/226, thereby causing the controller 214/224 to transmit instructions and/or display signals based on the map data and/or synthetic vision data to the aircraft display system 202 that cause the controller 206 to generate the 3D view 400 at the display 204.

The map data and/or synthetic vision data may include, but is not limited to, geographic information (e.g., geographical maps, topographical maps, satellite imagery, etc.), predetermined obstacle information (e.g., stored obstacle coordinates, elevations, types, statuses, etc.), flight plans or paths, and so forth. In some embodiments, the aircraft display system 202 and/or the aircraft server 212 can be configured to receive updates from the remote server 222. For example, the remote server 222 may be configured to periodically update the map data and/or synthetic vision data stored in the memory 216 of the aircraft server 212 or the memory 208 of the aircraft display system 202 with updates on the remote server 222. The map data and/or synthetic vision data may be updated on a schedule (e.g., daily, weekly, monthly, quarterly, yearly, or the like) or on demand (e.g., manually). Typically, updates will occur on ground (prior to flight), but in some instances, the remote server 222 may be configured to transmit updates during flight. In other embodiments, the map data and/or synthetic vision data stored by the aircraft display system 202 and/or the aircraft server 212 can be updated via portable media (e.g., flash drive, thumb drive, USB drive, external hard drive, memory card (e.g., SD-card), CD/DVD, or the like).

Figure 3:
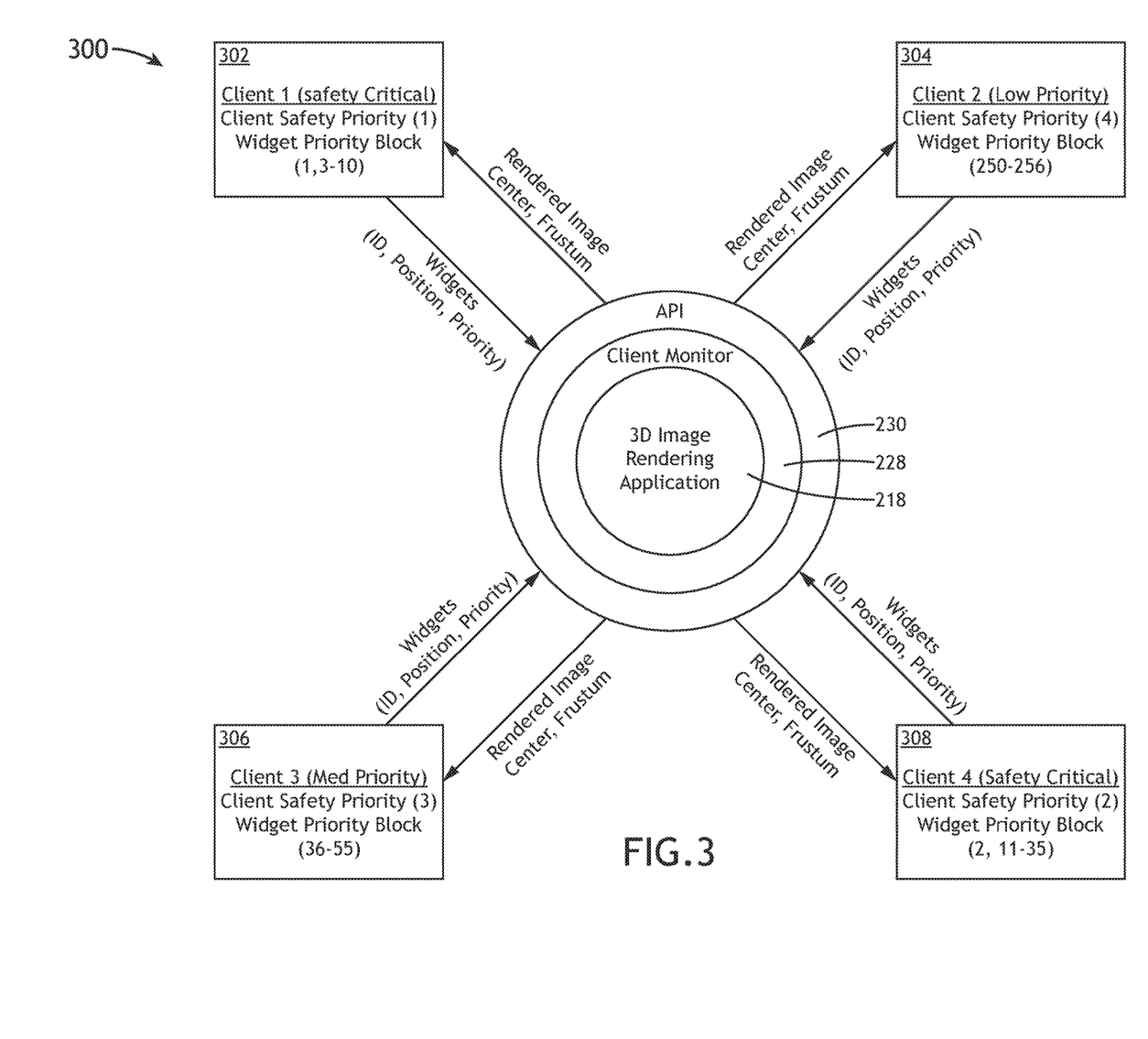
FIG. 3 is a block diagram illustrating connectivity between third-party clients and a third-party accessible API, such as the third-party accessible API illustrated in FIGS. 2A and 2B, in accordance with example embodiments of this disclosure.

In embodiments, the remote server 222 hosts the third-party accessible API 230 that allows third-party client devices/servers to generate and/or upload 3D symbologies that can be integrated into a 3D view generated via the 3D image rendering application 218. As shown in FIG. 3, the third-party accessible API 230 can be configured to receive a set of parameters for generating 3D symbology (e.g., a 3D widget) from one or more client devices/servers (e.g., clients 302, 304, 306, 308, etc.). The set of parameters transmitted by a client device/server may include the 3D symbology itself or a set of commands for generating the 3D symbology. For example, in embodiments, the 3D symbology is a 3D widget based on 3D graphics primitives. In some embodiments, the client-transmitted parameters further include positioning information for the 3D symbology, such as geo-referenced drawing coordinates/commands (e.g., latitude, longitude and/or altitude coordinates/commands). The API 230 can alternatively or additionally be configured to accept x-y-z coordinates, or the like). When 3D interface is via vertex positions, if the image is a composite of multiple clients, it may require each client to be synchronized on the conversion from the world being rendered and the pixel-based 3D world. To avoid this, the API 230 may employ an interface that utilizes 3D symbology/widget position in latitude, longitude, and altitude coordinates, an identification (ID) for each 3D symbology/widget, and a priority level for each 3D symbology/widget position (e.g., for image layering, adjustable viewing characteristics (e.g., size and/or transparency), etc.). In some embodiments, the client-transmitted parameters may further include, but are not limited to, a priority level, transparency setting, layer position, processor and/or memory utilization, or any combination thereof.

The API 230 and associated server software may be configured to project an anchor point for the 3D symbology/widget (e.g., in latitude, longitude and altitude coordinates) into a relative pixel position based on the current scene. The API 230 may be configure configured to project the remaining vertices of the 3D symbology/widget into the current scene. Layer visibility of the 3D symbology/widget may be based on location relative to user eye point and priority level/ranking of the 3D symbology/widget. In some embodiments, the 3D symbology 404 from the API 230 is always lower priority than the proprietary symbology 402. In this regard, the 3D symbology 404 may be shown with greater transparency or at a lower layer of the 3D view 400 (e.g., underneath or behind the proprietary symbology 402) when the 3D symbology 404 and the proprietary symbology 402 have overlapping positions.

With reference to the topology 300 illustrated in FIG. 3, in some embodiments, interface parameters for the system 200 include, but are not limited to, the following. From the server 222 hosting the API 230 examples may include: Center of Interest (e.g., latitude and longitude coordinates); Area being rendered (e.g., Frustum); X/Y/Z screen position based on some inline frame (Iframe) from the image so the third-party can know what is being drawn on the screen (e.g., Exo, Ego, Overhead). From a client device/server (e.g., client 302, 304, 306, or 308) examples may include: Widget ID (e.g., identification of the 3D symbology/widget being referenced); and Runtime Modifiable Parameters, such as Widget Description (e.g., 3D Vectors correlated to texture coordinates and a list of triangle faces), Position (e.g., either latitude, longitude, and altitude coordinates, or position relative to the Center of Interest), Priority (e.g., a numeric value representing priority). In an example, 1 is the highest priority and 256 is lowest; however, any range of numbers may be used. The system 200 may assign the priority to be used by clients to ensure that higher priority items will display even when lower priority items attempt to block. In some embodiments, the API 230 may be further configured with transparency data that allows a client, when necessary, to present objects that can be set to allow objects behind it in the rendering to be seen through the closer object. In some embodiments, the API 230 may be further configured with Time of Validity (TOV) parameters that allow the main application (e.g., 3D image rendering application 218) to determine if messages/updates including or from 3D symbologies/widgets have been received out of order, or if the current message has gone stale. In embodiments, the 3D symbologies/widgets may be configured to send changes to update the runtime modifiable parameters so a new large "scene" doesn't have to be re-sent.

Controller 214/224 may be configured to receive the 3D symbology from the third-party accessible API 230. For example, the 3D symbology and associated parameters may be supplied in the form of updates to map data and/or synthetic vision data from the API 230 to 3D image rendering application 218. As shown in FIGS. 2A and 2B, the 3D image rendering application 218 and the API 230 may be hosted by the same server (e.g., both hosted by the aircraft server 212 or the remote server 222). In other embodiments, the 3D image rendering application 218 and the API 230 may be distributed between the aircraft server 212 and the remote server 222, respectively, or vice versa. As shown in FIG. 4, controller 214/224 may be further configured to generate a 3D view 400 at the display 204 that includes proprietary symbology 402 and 3D symbology 404 from the third-party accessible API 230.

Typically, any use of a widget to rendering concept is not focused on measuring deterministic performance. However, a 3D widget set built upon 3D graphics primitives allows for a deterministic description of the object (i.e., the 3D symbology/widget). Employing a deterministic 3D symbology/widget allows worst case execution and resource utilization to be established. In some embodiments, each 3D primitive may have a table that includes measured: local processor utilization; local memory utilization; graphics processor utilization; and/or graphics memory utilization. In some embodiments, each 3D symbology/widget may also have an associated table that includes total local and graphics processor utilization and/or total memory utilization.

In some embodiments, controller 214/224 is configured to determine processor and/or memory utilization of the 3D symbology/widget based on 3D graphics primitives for the 3D symbology/widget. Controller 214/224 may be further configured to selectively exclude the 3D symbology/widget from the 3D view when the processor and/or memory utilization exceeds a threshold percentage of available processor and/or memory resources.

Typical 3D rendering reduces frame rate (a failure case in safety application) when there are too many drawing elements. However, there is a need to support client applications without risk of reduced frame rate. In some embodiments, the client monitoring application running 228 on server 222/212 can be configured to maintain a list of accepted clients, ensuring only those clients expected in the system can connect, preventing erroneous performance due to additional clients. The clients may be assigned a safety priority used to determine order of load shed in the event of resource overrun.

The client monitoring application 228 may be further configured to track or maintain a list/database with a performance configuration for each client and maximum processing and memory utilization allowed for each application. This will allow the server 222/212, during runtime, to reject requests to draw more objects than the performance of the system can allow. This can help prevent a limit to a specific number of each type of widget, instead allowing any acceptable list of widgets in a scene as long as there are enough processor and memory resources.

In some embodiments, the client monitoring application 228 also maintains a list of 3D symbologies/widgets allocated to each client. The 3D symbologies/widgets built from multiple primitives may be loaded statically. The server 222/212 can be configured to compute the processing and memory for each 3D symbology/widget the client will use. Each 3D symbology/widget may have a layering priority from a block of values assigned to the client. The server 222/212 may be configured to stop processing any 3D symbologies/widgets that cause the performance configuration to be exceeded. In such instances, the server 222/212 may be configured to send a message to the client to notify the client that a failure associated with one or more of the client's 3D symbologies/widgets occurred.

Figure 5A:
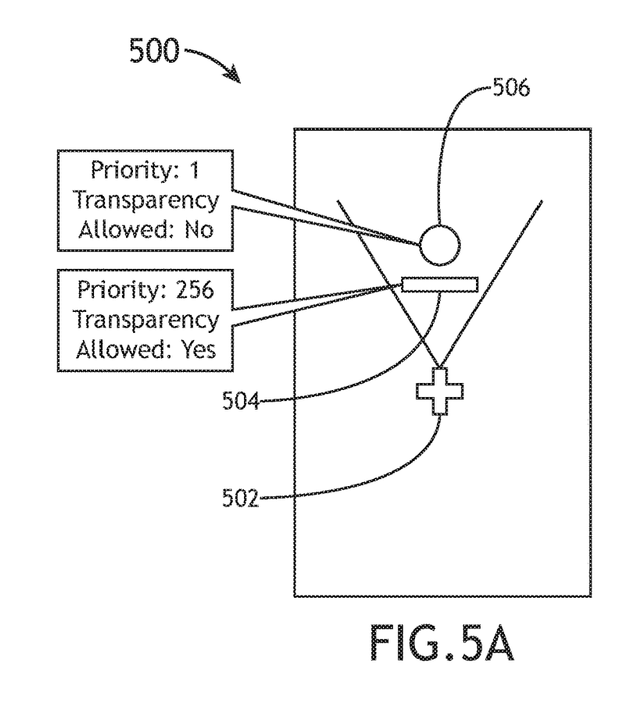
FIG. 5A illustrates multiple layers of a portion of a three-dimensional view that can be presented via a display of an aircraft display system, such as the aircraft display system illustrated in FIGS. 2A and 2B, in accordance with example embodiments of this disclosure.
Figure 5B:
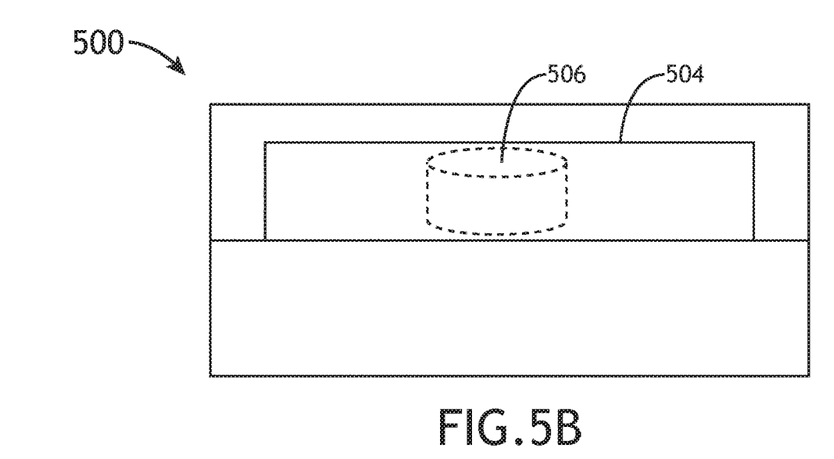
FIG. 5B illustrates the three-dimensional view without a priority scheme, in accordance with example embodiments of this disclosure.
Figure 5C:
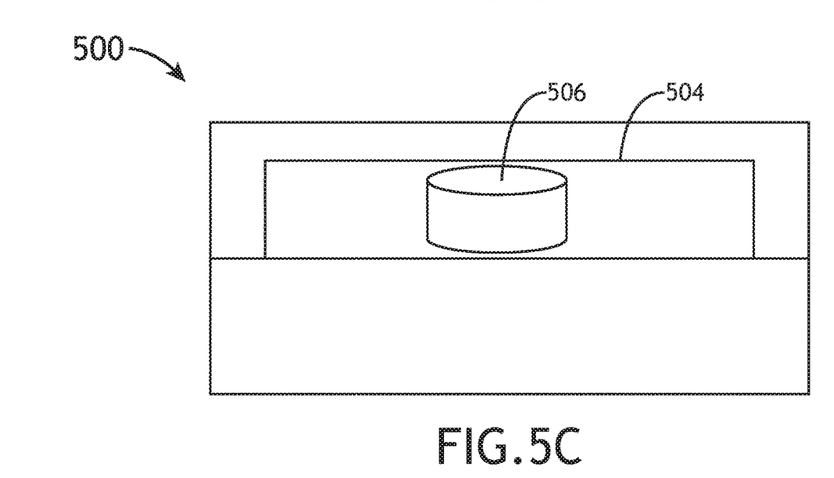
FIG. 5C illustrates the three-dimensional view with an implemented priority scheme, in accordance with example embodiments of this disclosure.

In some embodiments, controller 214/224 is configured to selectively exclude the 3D symbology from the three-dimensional view when the 3D symbology has an overlapping location with a higher priority symbology. Alternatively, controller 214/224 may be configured to increase transparency or decrease layer position of the 3D symbology within the 3D view when the 3D symbology has an overlapping location with a higher priority symbology. For example, FIG. 5A shows layers of a 3D view 500 including 3D symbologies 504 and 506 at the same location 502. In the example shown in FIG. 5A, symbology 504 is lower priority than symbology 506. Furthermore, in the example, symbology 504 has transparency features enabled, while symbology 506 does not have enabled transparency features. FIG. 5B shows an example of the 3D view without enabled transparency features, where symbology 504 potentially covers symbology 506 (a higher priority symbology). To avoid such a situation (which is potentially unsafe), controller 214/224 can be configured to increase transparency or decrease layer position of symbology 504 within the 3D view 500 so that symbology 506 remains visible within the 3D view 500. For example, symbology 506 may be either moved in front of symbology 504, or symbology 504 may become transparent enough for symbology 506 to be seen through symbology 504.

In some embodiments, the system 200 further includes visibility priority for each client to ensure the rendering engine (e.g., 3D image rendering application 218) can determine which client's 3D symbology/widget must be made visible if there is conflict. The visibility priority may be based on a combination of a critical range parameter and a priority parameter. In some instances, all items within the critical range must be displayed, and as such, any object not in the critical range will have, for example, transparency or wireframe applied to prevent interfering with a critical object. In the case of multiple critical objects in conflict, a "criticality priority" may be used to determine which objects must be displayed. The visibility priority may be dynamic, but the static configuration table of clients may be used to set maximum constraints. For example, a military system may draw low priority objects that in certain situations are required to set to a high priority. In another example, an un-trustworthy client may only be able to have low priority as it cannot be trusted to set its priority correctly. The server 222 may also make adjustment to RMP priorities (or just activate/deactivate). For example, example the user (e.g., pilot) could have a client priority turned up higher than its default to emphasize military symbology over civil symbology. The foregoing examples are provided to illustrates the concepts and embodiments disclosed herein but are not intended as limitations unless otherwise specified in the claims.

FIGS. 6A through 6D illustrate example embodiments of a method 600 that employs the API 230/system 200 described herein. In general, operations of disclosed processes (e.g., method 600) may be performed in an arbitrary order, unless otherwise provided in the claims.

Figure 6A:
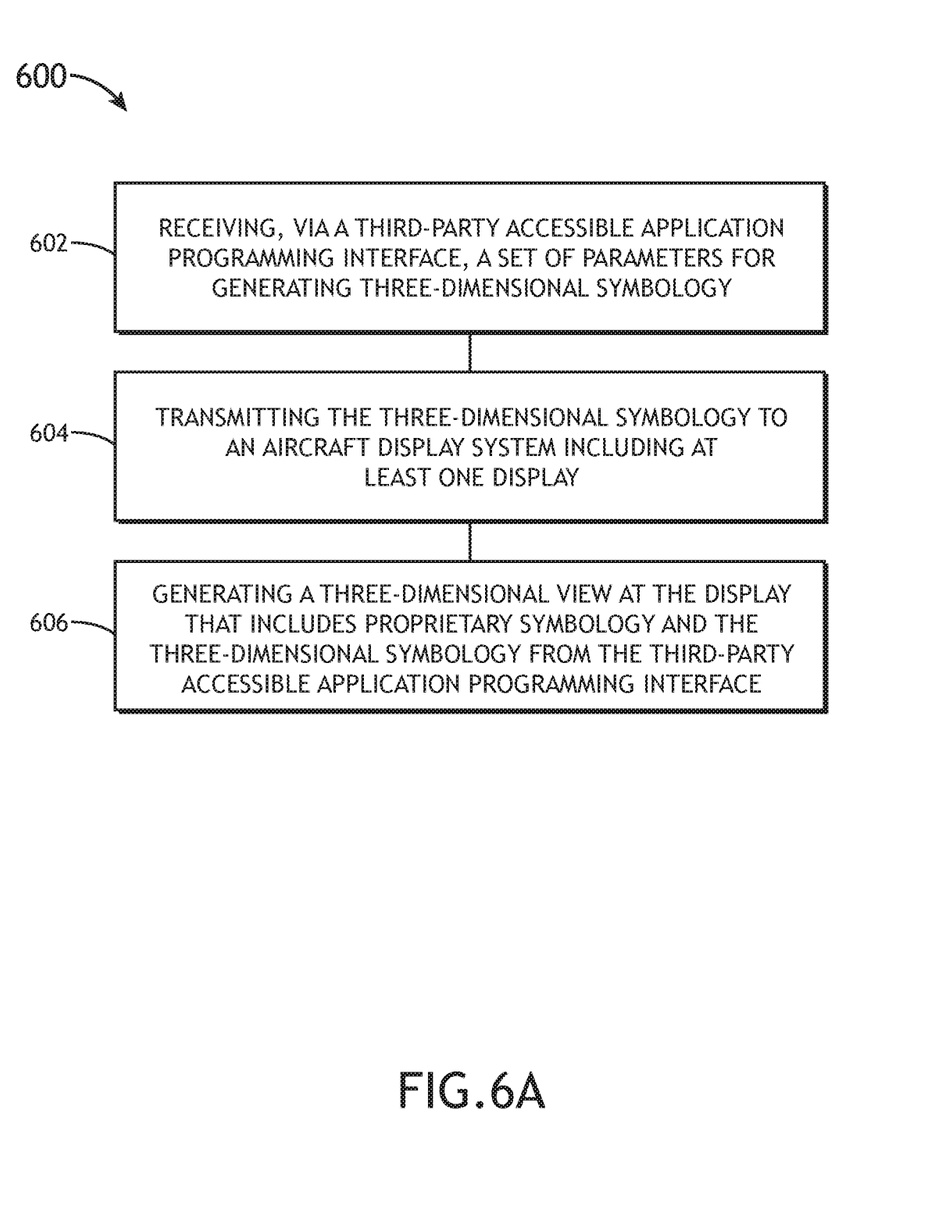
FIG. 6A is a flow diagram illustrating an example embodiment of a method that employs a third-party accessible API to generate symbology for a three-dimensional view.

As shown in FIG. 6A, the method 600 includes receiving a set of parameters for generating 3D symbology via the API 230 (block 602). The 3D symbology generated by the API 230 is transmitted to an aircraft display system 202 including at least one display 204 (block 604). A 3D view that includes proprietary symbology and 3D symbology from the third-party accessible API 230 is then generated at the display 204 (block 606).

Figure 6B:
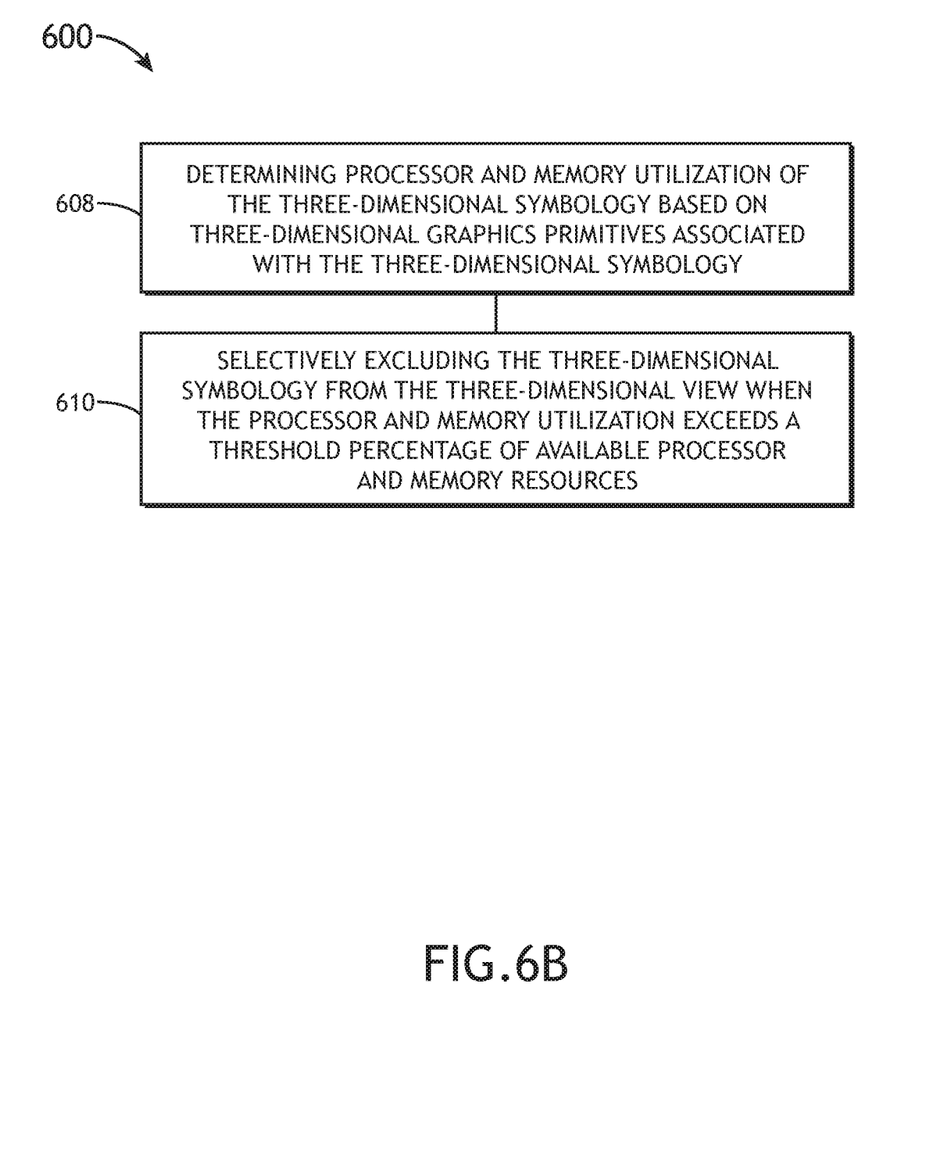
FIG. 6B is a flow diagram illustrating additional steps of the method illustrated in FIG. 6A, in accordance with example embodiments of this disclosure.
Figure 6C:
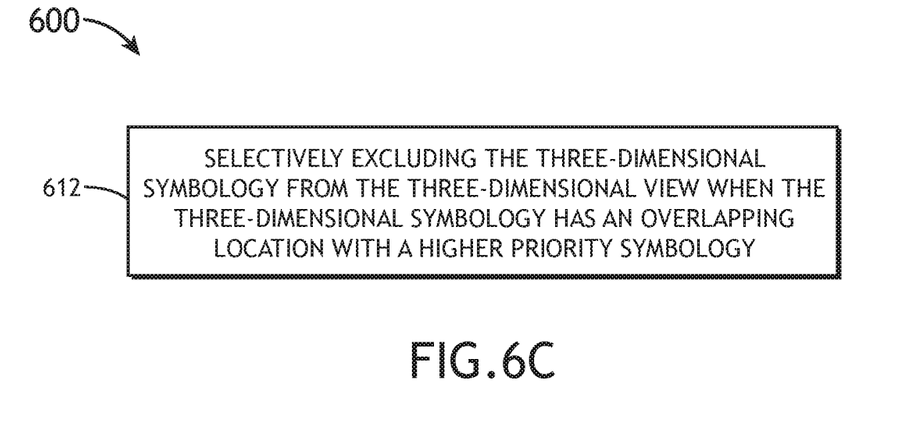
FIG. 6C is a flow diagram illustrating additional steps of the method illustrated in FIG. 6A, in accordance with example embodiments of this disclosure.
Figure 6D:
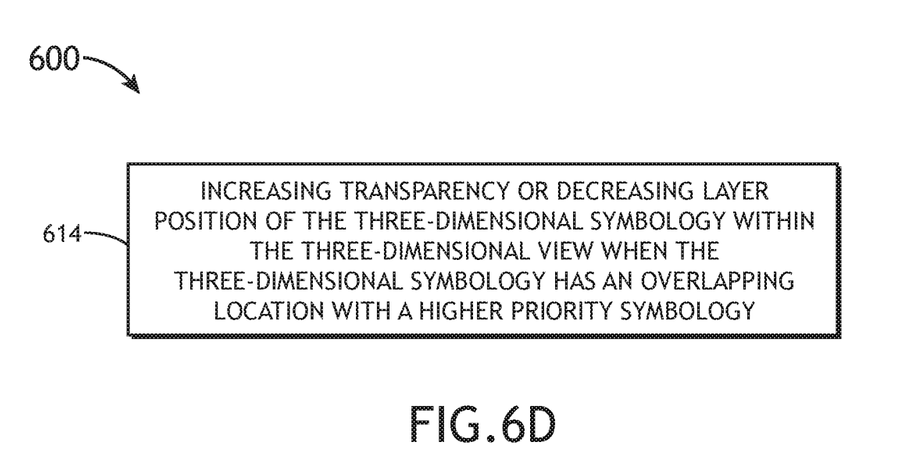
FIG. 6D is a flow diagram illustrating additional steps of the method illustrated in FIG. 6A, in accordance with example embodiments of this disclosure.

As shown in FIG. 6B, in some embodiments, the method 600 further includes determining processor and memory utilization of the 3D symbology based on 3D graphics primitives (block 608). The 3D symbology can then be selectively excluded from the 3D view when the processor and memory utilization of the 3D symbology exceeds a threshold percentage of available processor and memory resources (block 610). As shown in FIG. 6C, in other instances, the 3D symbology may be selectively excluded from the 3D view when the 3D symbology has an overlapping location with a higher priority symbology (block 612). As shown in FIG. 6D, alternatively, the transparency of the 3D symbology may be increased or the layer position of the 3D symbology may be decreased when the 3D symbology has an overlapping location with a higher priority symbology (block 614)

The method 600 may further include any step or operation implied or required by one or more embodiments of the API 230/system 200 described herein. The API 230/system 200 can also include any additional component or functionality expressed or implied by one or more embodiments of the method 600.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system for generating symbology for a three-dimensional view, comprising:
 a third-party accessible application programming interface configured to receive a set of parameters for generating three-dimensional symbology, wherein the third-party accessible application programming interface comprises a client monitoring application configured to:
maintain a list of accepted clients, wherein the list is configured to be used to determine which of a plurality of clients may connect to the third-party accessible application programming interface;
maintain a symbology list of which respective portion of the three-dimensional symbology is allocated to which respective client;
determine a visibility priority associated with each client; and
determine an order of load shed for the plurality of clients based on a safety priority assigned to each client;
an aircraft display system including at least one display; and
at least one controller configured to:
receive the three-dimensional symbology from the third-party accessible application programming interface, the three-dimensional symbology including coordinates associated with a position relative to the three-dimensional view; and
generate the three-dimensional view on the at least one display, wherein the three-dimensional view includes proprietary symbology and the three-dimensional symbology from the third-party accessible application programming interface,
wherein the generate the three-dimensional view includes integrating the three-dimensional symbology and the proprietary symbology into the three-dimensional view based on at least the coordinates,
wherein the three-dimensional view comprises a synthetic vision moving map of environment data surrounding an aircraft including the three-dimensional symbology and the proprietary symbology integrated therein,
wherein the set of parameters includes an identifier and a priority level for the three-dimensional symbology,
wherein the at least one controller is configured to selectively exclude the three-dimensional symbology from the three-dimensional view when the three-dimensional symbology has an overlapping location with a higher priority symbology,
wherein the at least one controller is configured to increase transparency or decrease layer position of the three-dimensional symbology within the three-dimensional view when the three-dimensional symbology has an overlapping location with the higher priority symbology.

2. The system of claim 1, wherein the at least one display comprises at least one of a primary flight display, a multi-function aircraft display, or an unmanned aerial vehicle controller display.

3. The system of claim 1, wherein the three-dimensional symbology comprises a three-dimensional widget based on three-dimensional graphics primitives.

4. The system of claim 3, wherein the at least one controller is configured to determine processor and memory utilization of the three-dimensional symbology based on the three-dimensional graphics primitives and is further configured to selectively exclude the three-dimensional symbology from the three-dimensional view when the processor and memory utilization exceeds a threshold percentage of available processor and memory resources.

5. The system of claim 1, wherein the set of parameters includes geo-referenced drawing coordinates.

6. The system of claim 5, wherein the geo-referenced drawing coordinates include latitude, longitude and altitude coordinates.

7. A method of generating symbology for a three-dimensional view, comprising:
receiving, via a third-party accessible application programming interface, a set of parameters for generating three-dimensional symbology, wherein the set of parameters includes an identifier and a priority level for the three-dimensional symbology;
transmitting the three-dimensional symbology to an aircraft display system including at least one display, the three-dimensional symbology including coordinates associated with a position relative to the three-dimensional view;
generating a three-dimensional view on the at least one display, wherein the three-dimensional view includes proprietary symbology and the three-dimensional symbology from the third-party accessible application programming interface,
selectively excluding the three-dimensional symbology from the three-dimensional view when the three-dimensional symbology has an overlapping location with a higher priority symbology; and
increasing transparency or decreasing layer position of the three-dimensional symbology within the three-dimensional view when the three-dimensional symbology has an overlapping location with the higher priority symbology,
wherein the generating of the three-dimensional view includes integrating the three-dimensional symbology and the proprietary symbology into the three-dimensional view based on at least the coordinates,
wherein the three-dimensional view comprises a synthetic vision moving map of environment data surrounding an aircraft including the three-dimensional symbology and the proprietary symbology integrated therein,
wherein the third-party accessible application programming interface comprises a client monitoring application configured for:
maintaining a list of accepted clients, wherein the list is configured to be used to determine which of a plurality of clients may connect to the third-party accessible application programming interface;
maintaining a symbology list of which respective portion of the three-dimensional symbology is allocated to which respective client;
determining a visibility priority associated with each respective client; and
determining an order of load shed for the plurality of clients based on a safety priority assigned to each client.

8. The method of claim 7, wherein the at least one display comprises at least one of a primary flight display, a multi-function aircraft display, or an unmanned aerial vehicle controller display.

9. The method of claim 7, wherein the three-dimensional symbology comprises a three-dimensional widget based on three-dimensional graphics primitives.

10. The method of claim 9, further comprising:
determining processor and memory utilization of the three-dimensional symbology based on the three-dimensional graphics primitives; and
selectively excluding the three-dimensional symbology from the three-dimensional view when the processor and memory utilization exceeds a threshold percentage of available processor and memory resources.

11. The method of claim 10, wherein the set of parameters includes geo-referenced drawing coordinates.

12. The method of claim 11, wherein the geo-referenced drawing coordinates include latitude, longitude and altitude coordinates.

\* \* \* \* \*